United States Patent
Lombardi et al.

(10) Patent No.: US 10,059,244 B2
(45) Date of Patent: Aug. 28, 2018

(54) APPARATUS AND METHOD FOR AN ADJUSTABLE CUP HOLDER

(71) Applicant: GRACO CHILDREN'S PRODUCTS INC., Atlanta, GA (US)

(72) Inventors: Nicholas James Lombardi, Atlanta, GA (US); Zachary Rubin, Atlanta, GA (US)

(73) Assignee: GRACO CHILDREN'S PRODUCTS INC., Atlanta, GA (US)

( * ) Notice: Subject to any disclaimer, the term of this patent is extended or adjusted under 35 U.S.C. 154(b) by 0 days.

(21) Appl. No.: 15/451,496

(22) Filed: Mar. 7, 2017

(65) Prior Publication Data

US 2017/0259720 A1    Sep. 14, 2017

Related U.S. Application Data

(60) Provisional application No. 62/304,989, filed on Mar. 8, 2016.

(51) Int. Cl.
*B60N 2/26* (2006.01)
*B60N 2/28* (2006.01)
(Continued)

(52) U.S. Cl.
CPC ............. *B60N 3/102* (2013.01); *A47D 1/00* (2013.01); *A47D 15/00* (2013.01); *B60N 2/28* (2013.01); *B62B 9/00* (2013.01)

(58) Field of Classification Search
CPC . A47D 1/00; A47D 15/00; B62B 9/00; B60N 3/102; B60N 2/28
(Continued)

(56) References Cited

U.S. PATENT DOCUMENTS 3,215,467 A * 11/1965 McFarland ............... A47C 7/70
                                                        297/188.15 X
4,733,908 A *  3/1988 Dykstra ................. B60N 3/102
                                                        297/188.16 X
(Continued)

FOREIGN PATENT DOCUMENTS

| CN | 203032454 U | 7/2013 |
| JP | 2001-039198 A | 2/2001 |
| WO | 2016/033398 A1 | 3/2016 |

OTHER PUBLICATIONS

Search Report issued in GB Application No. 1703426.5, dated Jul. 5, 2017 (5 pages).

*Primary Examiner* — Rodney Barnett White
(74) *Attorney, Agent, or Firm* — Eversheds Sutherland (US) LLP

(57) ABSTRACT

A child seat can include a seat bottom and seat back. The seat back can be fixedly, rotatably, and/or removably coupled to the seat bottom. The child seat can further include an adjustable cup holder that can be integrally formed with the seat bottom or positioned adjacent to the seat bottom. For example, the child seat can include one or more arm rests positioned adjacent the seat bottom and the adjustable cup holder can be provided in at least one of the arm rests. The adjustable cup holder can include a static cup holder section and a rotatable cup holder section. The rotatable cup holder section can rotate with respect to the static cup holder section from a stored configuration to a use configuration. The adjustable cup holder can include alignment tabs and corresponding recessed slots and/or bosses and corresponding boss receivers to assist in positioning the adjustable cup holder.

20 Claims, 13 Drawing Sheets

(51) Int. Cl.
*A47C 7/62* (2006.01)
*B60N 3/10* (2006.01)
*A47D 1/00* (2006.01)
*A47D 15/00* (2006.01)
*B62B 9/00* (2006.01)

(58) Field of Classification Search
USPC .................................... 297/250.1–256.16
See application file for complete search history.

(56) References Cited

U.S. PATENT DOCUMENTS

| | | | | |
|---|---|---|---|---|
| 4,783,037 A * | 11/1988 | Flowerday | ............ | B60N 3/102 297/188.17 X |
| 4,907,775 A * | 3/1990 | Lorence | ................ | B60N 3/102 297/188.17 X |
| 4,981,277 A * | 1/1991 | Elwell | .................. | B60N 3/102 224/281 |
| 5,060,899 A | 10/1991 | Lorence et al. | | |
| 5,104,186 A * | 4/1992 | Kwasnik | ............ | B60N 2/4606 297/188.16 X |
| 5,170,980 A | 12/1992 | Burrows et al. | | |
| 5,232,190 A * | 8/1993 | Gould | ................. | B60N 2/4606 297/188.18 X |
| 5,248,183 A | 9/1993 | Gignac et al. | | |
| 5,271,661 A * | 12/1993 | Gould | ................. | B60N 2/4686 297/188.15 |
| 5,330,146 A * | 7/1994 | Spykerman | ............ | B60N 3/102 297/188.17 X |
| 5,474,272 A * | 12/1995 | Thompson | ............... | A47C 7/68 297/188.18 X |
| 5,489,054 A * | 2/1996 | Schiff | .................... | B60N 3/002 297/188.14 X |
| 5,505,516 A * | 4/1996 | Spykerman | ............ | B60N 3/102 297/188.14 X |
| 5,615,925 A * | 4/1997 | Kain | .................... | B60N 2/2821 297/256.15 X |
| 5,685,604 A * | 11/1997 | Kain | .................... | B60N 2/2839 297/250.1 |
| 5,690,308 A * | 11/1997 | Jankovic | ................ | B60N 3/103 248/311.2 |
| 5,749,554 A * | 5/1998 | Avila | .................... | B60N 3/102 297/188.17 X |
| 5,791,616 A * | 8/1998 | Volkmann | ............. | B60N 3/106 297/188.15 X |
| 5,800,011 A * | 9/1998 | Spykerman | ............ | B60N 3/106 297/188.15 X |
| 5,897,089 A * | 4/1999 | Lancaster | ............. | B60N 3/102 297/188.17 X |
| 5,964,502 A * | 10/1999 | Stephens | ............. | B60N 2/2812 297/250.1 |
| 6,361,105 B1 * | 3/2002 | Turner | .................... | A47C 7/62 297/188.15 X |
| 6,412,862 B1 * | 7/2002 | Dickerson | ................ | A47C 7/70 297/188.14 X |
| 6,467,839 B1 * | 10/2002 | Kain | ....................... | B60N 2/28 297/188.14 X |
| 6,478,372 B1 * | 11/2002 | Lemmeyer | ........... | B60N 2/2821 297/188.18 |
| 6,520,576 B1 * | 2/2003 | Burns | ................... | B60N 2/4606 297/188.15 X |
| 6,550,862 B2 * | 4/2003 | Kain | ..................... | B60N 2/2812 297/250.1 X |
| 6,575,542 B2 * | 6/2003 | Shimajiri | ............... | B60N 3/102 224/281 |
| 6,592,180 B2 * | 7/2003 | Combs | ..................... | B60N 2/28 297/188.14 X |
| 6,648,194 B2 * | 11/2003 | Schaal | .................... | B60N 3/102 297/188.17 X |
| 6,705,675 B1 * | 3/2004 | Eastman | ............... | B60N 2/2806 297/250.1 X |
| 6,997,509 B2 * | 2/2006 | Kain | ..................... | B60N 2/2866 297/250.1 X |
| 7,140,660 B2 * | 11/2006 | Oana | ....................... | B60N 3/102 297/188.17 X |
| 7,195,314 B2 * | 3/2007 | Spence | ................ | B60N 2/2851 297/188.15 X |
| 7,278,683 B2 * | 10/2007 | Williams | ............. | B60N 2/2851 297/250.1 X |
| 7,360,830 B2 * | 4/2008 | Balensiefer | .......... | B60N 2/2866 297/188.08 |
| 7,625,043 B2 * | 12/2009 | Hartenstine | .......... | B60N 2/2806 297/250.1 |
| 8,256,836 B2 * | 9/2012 | Haut | ..................... | B60N 2/2866 297/188.14 |
| 8,439,438 B2 * | 5/2013 | Oldani | .................. | B60N 3/105 297/188.15 X |
| 8,439,439 B2 * | 5/2013 | Meeker | ................. | B60N 2/2806 297/250.1 |
| 8,651,572 B2 * | 2/2014 | Medeiros | ............... | A47D 1/002 297/256.1 |
| 8,727,191 B2 * | 5/2014 | Winterhalter | ......... | B60N 3/10 224/409 |
| 8,757,572 B1 * | 6/2014 | Starr | ....................... | F16M 13/02 297/188.14 X |
| 8,899,678 B2 * | 12/2014 | Doolan | .................. | B60N 3/101 297/256.13 |
| 8,960,793 B2 * | 2/2015 | Gillett | .................. | B60N 2/2821 297/250.1 X |
| 9,155,396 B2 * | 10/2015 | Hutchinson | ............ | B60N 2/286 |
| 9,162,600 B2 * | 10/2015 | Gaudreau, Jr. | ......... | B60N 3/103 |
| 9,452,694 B2 * | 9/2016 | Brady | ................... | B60N 2/2866 |
| 2003/0075957 A1 | 4/2003 | Kain | | |
| 2006/0170257 A1 * | 8/2006 | Marshall | ................ | A47C 7/68 297/188.14 |
| 2012/0292956 A1 * | 11/2012 | Gaudreau, Jr. | ......... | B60N 3/103 297/188.04 |
| 2016/0059762 A1 | 3/2016 | Poirer et al. | | |
| 2017/0210255 A1 * | 7/2017 | Jaradi | .................. | B60N 2/4686 |

* cited by examiner

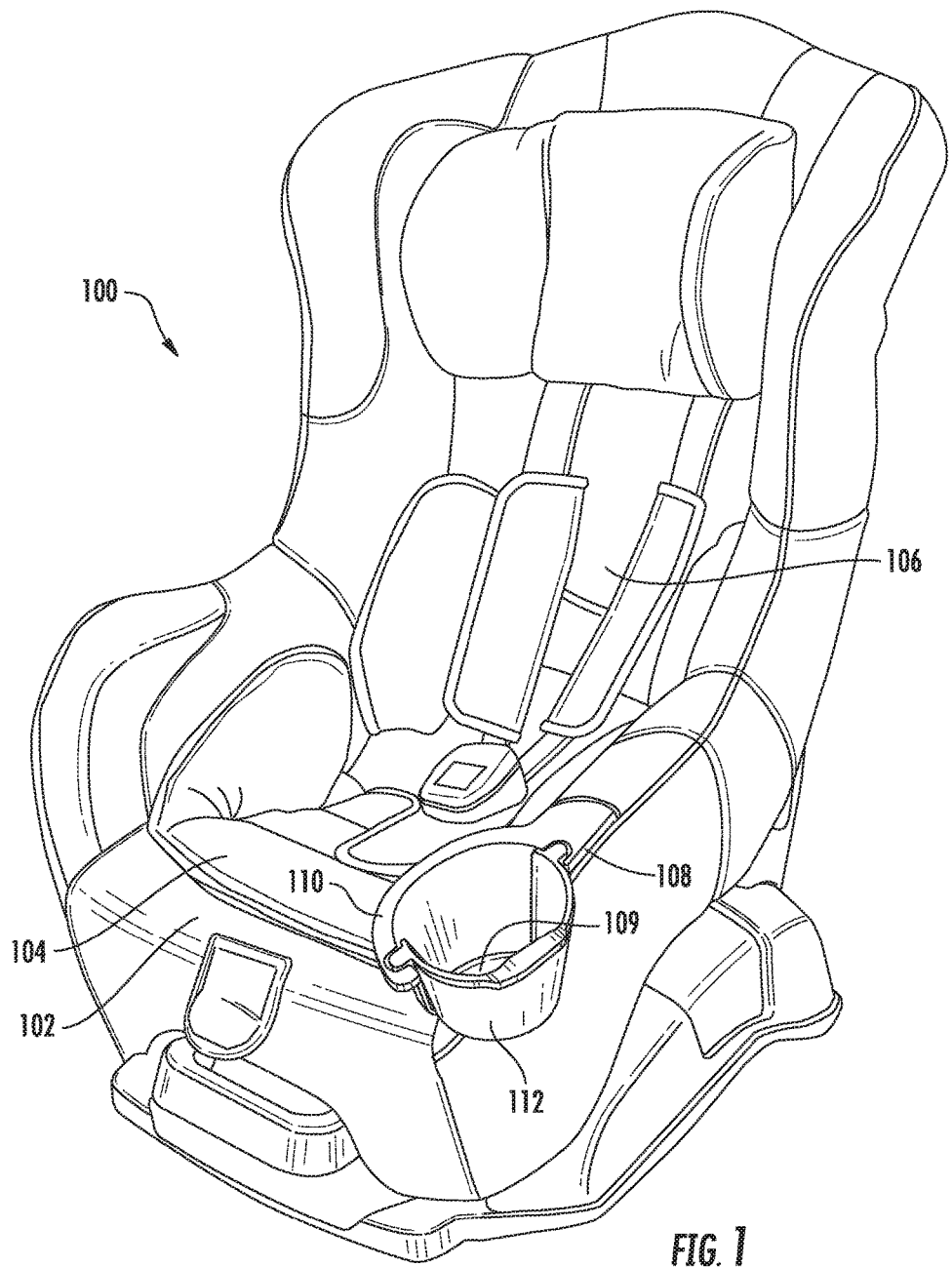

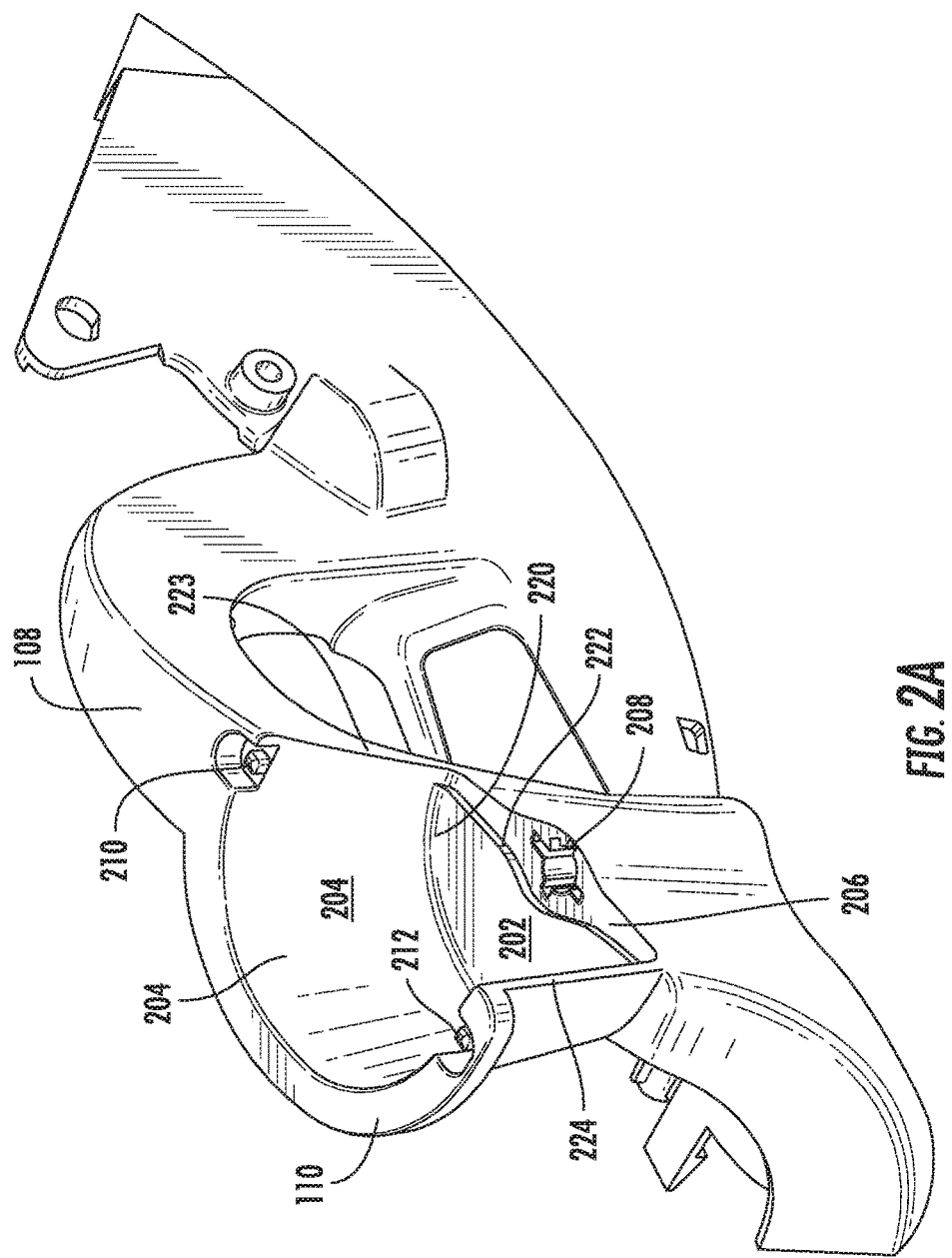

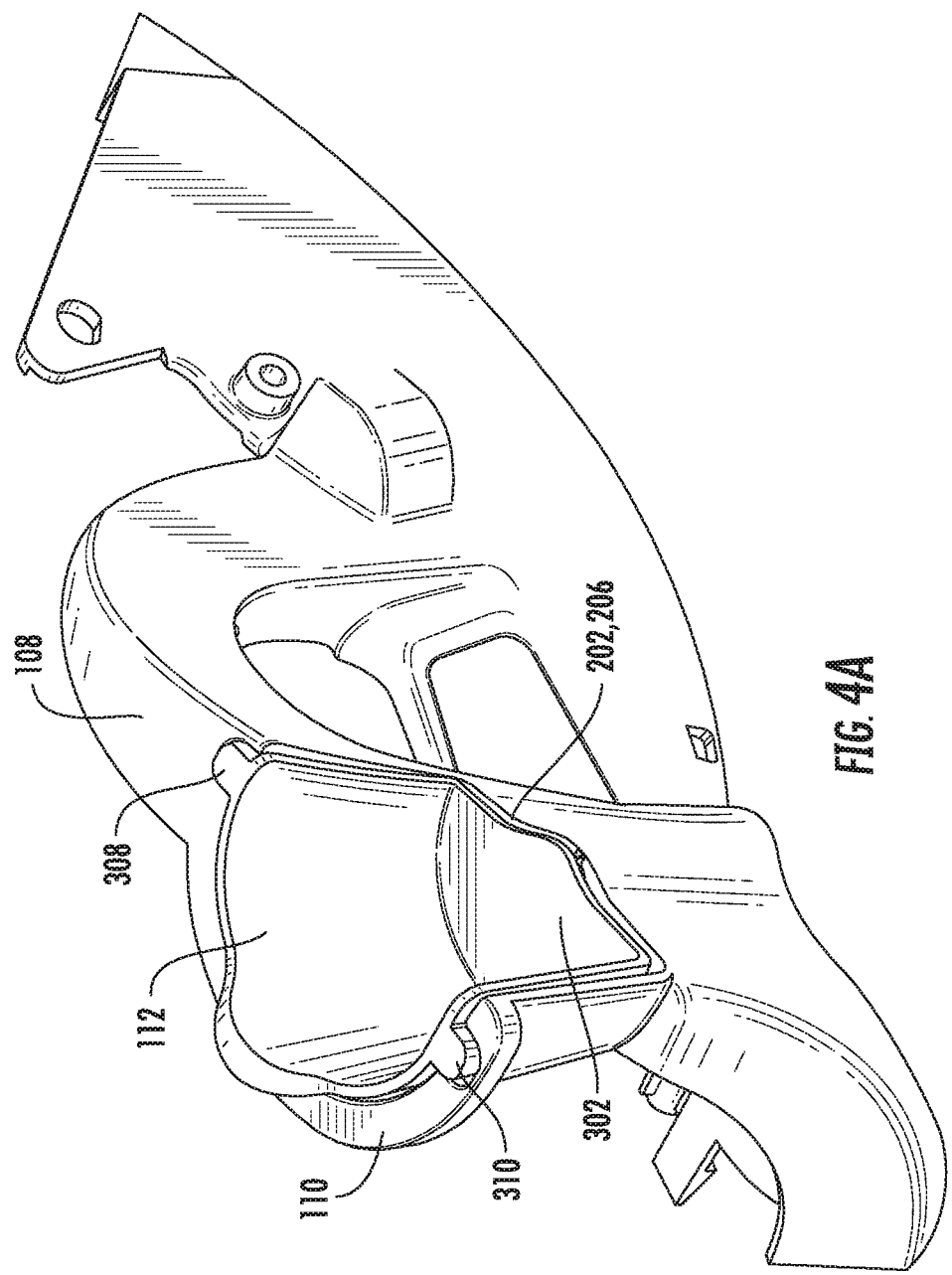

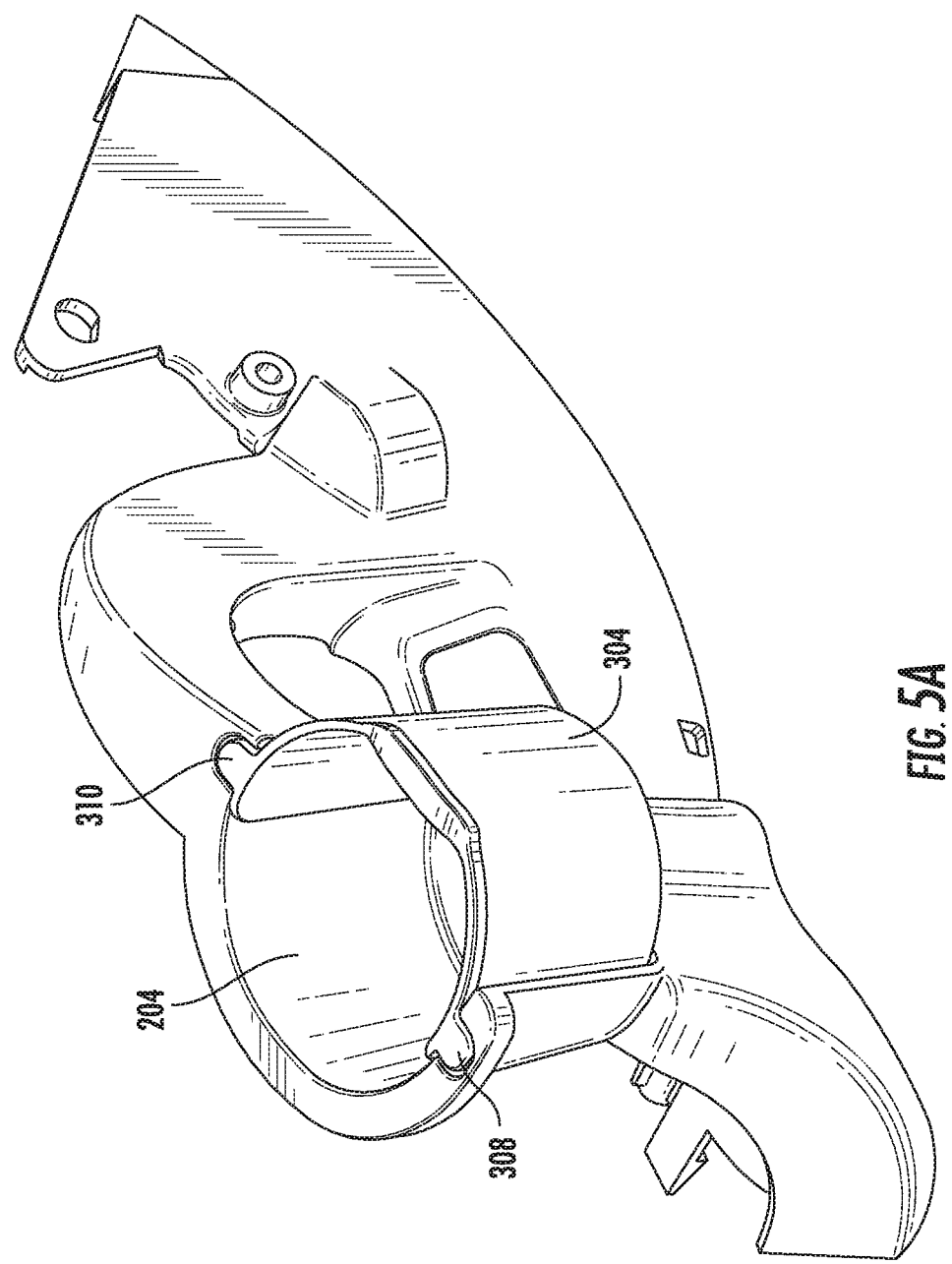

APPARATUS AND METHOD FOR AN ADJUSTABLE CUP HOLDER

RELATED APPLICATIONS

This application claims priority under 35 U.S.C. § 119 to U.S. Provisional Patent Application No. 62/304,989 filed Mar. 8, 2016, and titled "Apparatus and Method for an Adjustable Cup Holder," the entire contents of which are hereby incorporated herein by reference for all purposes.

TECHNICAL FIELD

Embodiments disclosed herein are generally related to children's seating systems and more particularly to apparatuses and methods for an adjustable cup holder that can be included with the children's seating system.

BACKGROUND

A portion of an infant or child's car seat, booster seat (with or without a fixed or detachable seat back), stroller seat (whether fixed or detachable), or other infant or child seat where the cup holder is located is generally one of the widest parts of a seat. It is typically widest because the cup holder is usually placed along one side of the child seat and can extend horizontally out from the remaining portion of the side frame of that side of the child seat.

It is beneficial to reduce the width footprint of the child seat in order to, for example, maintain the designed seating capacity of the vehicle that the child seat is placed in or maintain a narrow footprint for a stroller used in narrow spaces. Reducing the overall width footprint of the child seat can also help to insure, for example, that the child seat (e.g., a car seat or booster seat) remains within the seat belt area of the vehicle or that the stroller seat and cup holder are substantially contained between the wheels and/or side frames of the stroller. However, many consumers feel a cup holder is a necessary feature of a child seat. Therefore, reducing the width footprint of the child seat may typically need to be achieved without removing the cup holder.

Conventional methods for reducing the amount of space needed for a cup holder include making a portion of the cup holder out of a non-deformable material, such as hard plastic, and another portion of the cup holder that extends outside of the standard frame of the child seat out of a deformable material, such as a deformable plastic. In this embodiment, an adult can deform the outer portion of the cup holder towards the non-deformable portion of the cup holder when not in use. In another conventional method, an outer portion of the cup holder is removed and replaced with an elastic band that only extends outward from the standard frame of the child seat when a cup is placed within the cup holder. However, each of these conventional designs suffer from a number of drawbacks.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows:

FIG. 1 is a partial perspective view of a child car seat with an adjustable cup holder, in accordance with one example embodiment of the disclosure.

FIGS. 2A-2B present partial perspective and top plan views of a static cup holder section of the adjustable cup holder of FIG. 1, in accordance with one example embodiment of the disclosure.

FIGS. 4A-4C present partial perspective and top plan views of the adjustable cup holder in a stored configuration, in accordance with one example embodiment of the disclosure.

FIGS. 5A-5B present partial perspective and top plan views of the adjustable cup holder in a use, or unstored configuration, in accordance with one example embodiment of the disclosure.

DETAILED DESCRIPTION OF THE EXAMPLE EMBODIMENTS

Figure 2B:
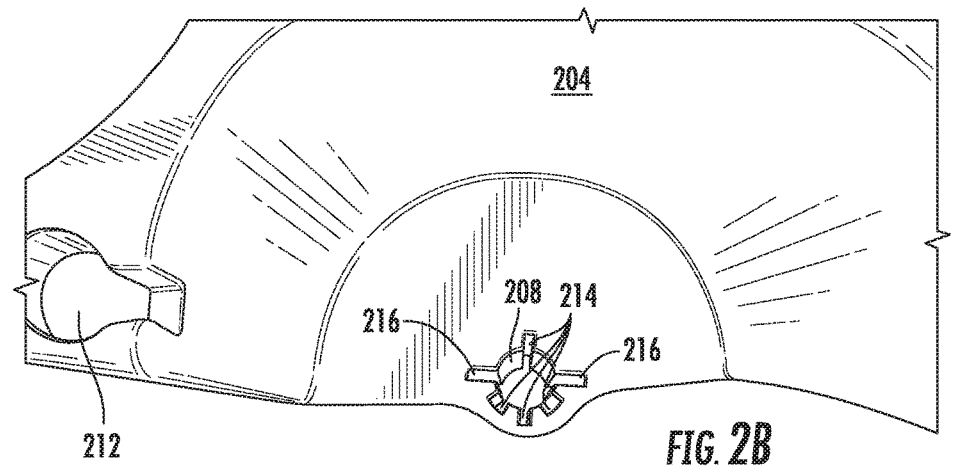

Example embodiments of the invention now will be described more fully hereinafter with reference to the accompanying drawings, in which example embodiments are shown. The concept disclosed herein may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

The example embodiments described herein and shown in the figures are described with reference to an infant or child's car seat. However this is for example purposes only. The adjustable cup holder shown and described herein is not intended to be used only in conjunction with an infant or child's car seat. The adjustable cup holder disclosed herein can also be incorporated into, provided on, or otherwise included with other infant and children's products including, but not limited to, strollers (whether with a fixed or detachable seat or seats), swings, high chairs, rockers, booster seats (with or without a fixed or detachable seat back), etc. (referred to hereinafter collectively as a "child seat"), and each other form of child seat should individually be read as an alternative embodiment to the infant or child's car seat described below and including the adjustable cup holder described below.

Certain dimensions and features of the example child seat and/or adjustable cup holder are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the child seat and/or adjustable cup holder and between features of the child seat and/or adjustable cup holder are described herein using the term "substantially." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

FIG. 1 is a partial perspective view of an example child seat apparatus 100 according to one example embodiment of the disclosure. In one example, the apparatus 100 can be a child car seat with an adjustable cup holder; however, other forms of child seat as discussed above, can be similarly used and incorporate the adjustable cup holder described below. Referring now to FIG. 1, the example apparatus 100 can include a child or infant safety seat or child car safety seat 102 (hereinafter "child car safety seat 102"). The child car safety seat 102 can be constructed having a one-piece molded seat shell that can define a seat bottom 104 and a seat back 106 formed as an integral unitary structure. In one example embodiment, the rear end of the seat bottom 104 can be joined to a lower end of the seat back 106 at a seat bight region (not shown). In certain example embodiments, the child car safety seat 102 can further include a head rest (not shown) which may or may not be height adjustable and can be connected, mounted, or otherwise attached to an upper end of the seat back 106.

The child car safety seat 102 can also include one or more fabric and/or other soft good layers applied to the seat shell. In certain alternative example embodiments, the child car safety seat 102 can be constructed having separate seat back and seat bottom components that can be attached or joined to one another for use. In these alternative examples, the seat bottom may be used without the seat back, such as for a booster seat, in certain example embodiments. The one or more seat shells of the child car safety seat 102 can be molded using any suitable process, such as injection molding, and can be formed from any suitable plastic, polymer, or other materials. Those of ordinary skill in the art will recognize that the actual shape and components of the child car safety seat 102 can vary from the configuration and construction of the example child car safety seat 102 shown in the figures and described herein.

The child car safety seat 102 can further include a harness system to assist in maintaining an infant or child within the defined space of the child car safety seat 102 along the seat bottom 104 and the seat back 106. The harness system can include one or more belts and buckles, such as a three or five-point harness system with one or more buckles for coupling the one or more belts together.

The child car safety seat 102 can also include a side panel 108 along each left and right side of the seat bottom 104 and positioned generally forward of the seat back 106. In one example, the side panel 108 can be configured as or otherwise include an arm rest. In one example, the arm rest is fixed and not able to move with respect to the remainder of the side panel. In another example embodiment, all or a portion of the arm rest can be rotatable from a generally horizontal position to a generally vertical position to assist with entering and/or exiting the child car safety seat 102.

Further, in certain example embodiments, at least one of the side panels 108 can also include an adjustable cup holder 109. In one example embodiment, the cup holder 109 is referenced as being adjustable because it can be adjusted from a stored configuration, where a cup would not be maintained in the cup holder 109, to a use configuration, where at least a bottom portion of a cup can be maintained in the cup holder 109. The cup holder 109 can include a static cup holder section 110 and a rotating cup holder section 112. In one example, the static cup holder section 110 can be integrally formed with the side panel 108 of the child car safety seat 102. Alternatively, the static cup holder section 110 can be a separate piece that is coupled to the side panel 108 or adjacent to the side panel 108 during construction of the child car safety seat 102.

FIGS. 2A-2B present perspective and top plan views of a static cup holder section 110 of the adjustable cup holder 109, in accordance with one example embodiment of the disclosure. Referring now to FIGS. 2A-2B, the example static cup holder section 110 can include a primary bottom surface 202 configured to receive a portion of a cup when in the use configuration. The primary bottom surface 202 can include a flat or substantially flat top surface for receiving a portion of a bottom end of a cup thereon. The top surface of the primary bottom surface 202 can also or alternatively include a friction increasing material disposed thereon to reduce slippage along the top surface.

In one example, the primary bottom surface 202 can be generally or substantially in the shape of a semicircle and have an outer perimeter edge 220 that is curved and/or radiused. The outer perimeter edge 220 may have a constant or variable radius. The primary bottom surface 202 can also include a side edge 222 that extends from a first end of the outer perimeter edge 220 to a second distal end of the outer perimeter edge 220. In one example embodiment, the side edge 222 can be generally in the shape of a sinusoidal wave between a first end of the outer perimeter edge 220 to a second distal end of the outer perimeter edge 220. Alternatively, the side edge 222 can be straight, substantially straight, or have another curvilinear shape between the first end of the outer perimeter edge 220 and the second distal end of the outer perimeter edge 220.

The static cup holder section 110 can further include a static side wall 204 coupled to or integrally formed with the primary bottom surface 202 and extending generally vertically up from the primary bottom surface 202 to define an interior side surface. In certain example embodiments, the static side wall 204 can extend vertically up from the primary bottom surface 202 at an angle between 90-120 degrees and more preferably between 90-110 degrees and even more preferably between 90-100 degrees to the primary bottom surface 202. In one example embodiment, the static side wall 204 is curved and has a curvature that substantially matches the curvilinear shape and can have the same or greater radius as that of the outer perimeter edge 220 of the primary bottom surface 202. The static side wall 204 can further have a smooth interior side surface having a generally concave shape. In another example embodiment, the static side wall 204 is made up of one or multiple flat or substantially flat wall surfaces that can be joined along or formed with corresponding lateral vertically extending edges that together form the static side wall 204. In certain example embodiments, the side wall 204 has a perimeter that extends between 160-220 degrees and more preferably between 180-210 degrees and even more preferably between 180-200 degrees.

In certain example embodiments, the static cup holder section 110 can also include a recessed bottom surface 206 attached to or integrally formed with the primary bottom surface 202. In one example, the recessed bottom surface 206 has a top surface that is disposed generally below the top surface of the primary bottom surface 202 to create a "step-down" effect and extends out from the side edge 222 of the primary bottom surface 202. For example, the top surface of the recessed bottom surface 206 may be disposed below the top surface of the primary bottom surface 202 at a range of 0.001-0.250 inches. As such, the top surface of the primary bottom surface 202 can be positioned above the top surface of the recessed bottom surface 206. The top surface of the recessed bottom surface 206 can be configured to abut and provide vertical support for a portion of a bottom surface of the rotating cup holder section 112 when the cup holder 109 is in the use position.

The static cup holder section 110 can also include a first recessed slot 210 disposed along a top edge of the static side wall 204 and a second recessed slot 212 disposed along the top edge of the static side wall 204. While the example embodiment of FIGS. 2A-2B shows the first and second recessed slots 210 and 212 disposed along a top edge of the static side wall 204, in an alternative embodiment, the first recessed slot 210 can be disposed anywhere vertically along the first side edge 223 of the static side wall 204 and the second recessed slot 212 can be disposed anywhere vertically along the second side edge 224 of the static side wall 204. In one example, each of the first recessed slot 210 and second recessed slot 212 are an indented or recessed opening or channel along a top surface of the static cup holder section 110 and are sized and shaped to receive a corresponding alignment tab on the rotating cup holder section 112 as described below. In certain example embodiments, the shape of each of the first recessed slot 210 and the second recessed slot 212 can be the same or substantially similar to and slightly larger than the corresponding alignment tab that it is intended to receive. These shapes can include, but are not limited to round, oval, elliptical, square, rectangular or any other geometric shape. The first recessed slot 210 can be disposed anywhere between 90-210 degrees from the second recessed slot 212 along an outer radius of the static side wall 204 and more preferably between 120-180 degrees and even more preferably between 150-180 degrees and even more preferably 180 degrees.

As shown in FIG. 2B, either the primary bottom surface 202 or the recessed bottom surface 206 can also include an aperture 208. The aperture 208 can be a through-hole that provides a passageway through the primary bottom surface 202 or the recessed bottom surface 206. In certain examples, the aperture 208 can be configured to receive and provide a rotation channel for an alignment shaft of the rotating cup holder section 112 such that the rotating cup holder section 112 would rotate about an axis extending vertically through the center or substantially the center of the aperture 208.

In certain example embodiments, the aperture 208 can also include alignment means to assist with properly aligning the alignment shaft to place the cup holder 109 in one of the use or stored configurations. In one example, the alignment means can be boss receivers 214, 216. A boss receiver 214, 216 can be one or more openings having a linear or other shape and extending out from the outer radial edge or perimeter of the aperture 208. Further, the boss receiver 214, 216 can have different sizes so that only certain corresponding bosses on the alignment shaft can fit into certain ones of the boss receivers 214, 216. For example, the aperture 208 can include one or more minor boss receivers 214 and one or more major boss receivers 216. In this example, the major boss receivers 216 are the same shape but longer (extend out further radially from the center of the aperture 208) than the minor boss receivers 214 and are configured to receive a larger boss than the minor boss receivers 214. Alternatively, the major boss receivers 216 could be wider (have a greater circumferential distance) than the minor boss receivers 214 or could have a different shape than the minor boss receivers 214.

In the example of FIG. 2B, two minor boss receivers can be provided along the outer perimeter of the aperture 208 and disposed at or substantially 180 degrees apart from one another along the perimeter of the aperture 208. In addition, two major boss receivers can be provided along the outer perimeter of the aperture 208 and disposed at or substantially 180 degrees apart from one another along the perimeter of the aperture 208 such that each major boss receiver 216 is at or substantially 90 degrees from each minor boss receiver 214. While the example embodiment of FIG. 2B shows two major boss receivers 216 and two minor boss receivers 214, those of ordinary skill in the art will recognize that fewer or greater numbers of each are possible. Further, while the example embodiment of FIG. 2B shows the two major boss receivers 216 disposed at or substantially 180 degrees from one another and the two minor boss receivers 214 disposed at or substantially 180 degrees from one another, this is for example purposes only as other layouts are contemplated within the scope of this disclosure. For example, the major boss receivers 216 could be disposed anywhere between 5-180 degrees apart from one another along the perimeter of the aperture 208 and the minor boss receivers 214 can also be positioned anywhere between 5-180 degrees apart from one another along the perimeter of the aperture 208 in other example embodiments.

In another example embodiment, the alignment means can include a cam and a cam follower. In one example, the cam can be positioned on the static cup holder section 110 and the cam follower can be disposed on the rotating cup holder section 112. In another example, the cam can be positioned on the rotating cup holder section 112 and the cam follower can be disposed on the static cup holder section 110. Other alignment means such as keys and keyways are also contemplated herein.

Figure 3A:
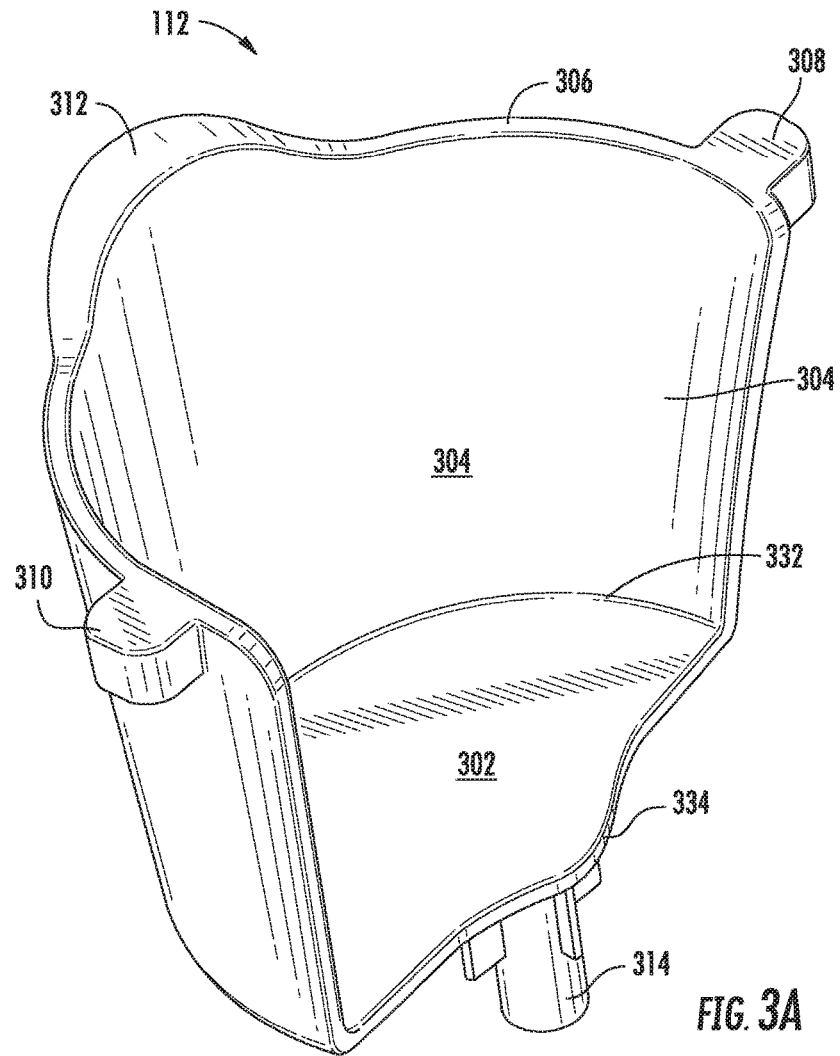
FIGS. 3A-3C present partial perspective and side elevation views of a rotating cup holder section of the adjustable cup holder, in accordance with one example embodiment of the disclosure.
Figure 3B:
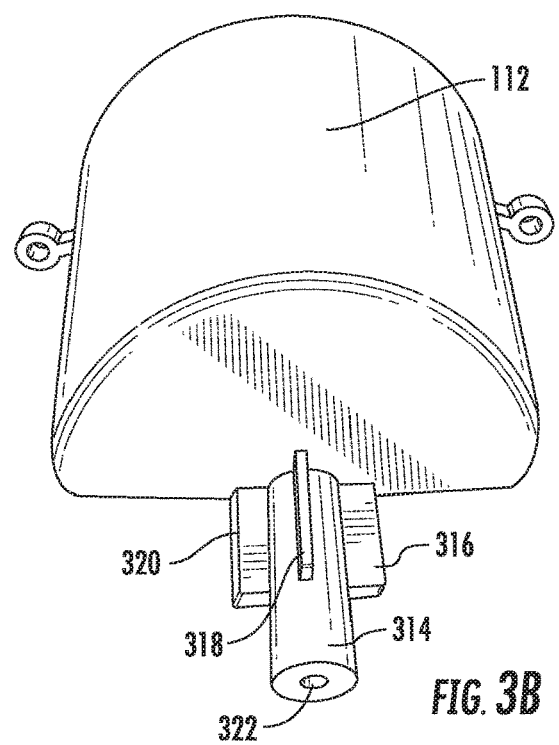
Figure 3C:
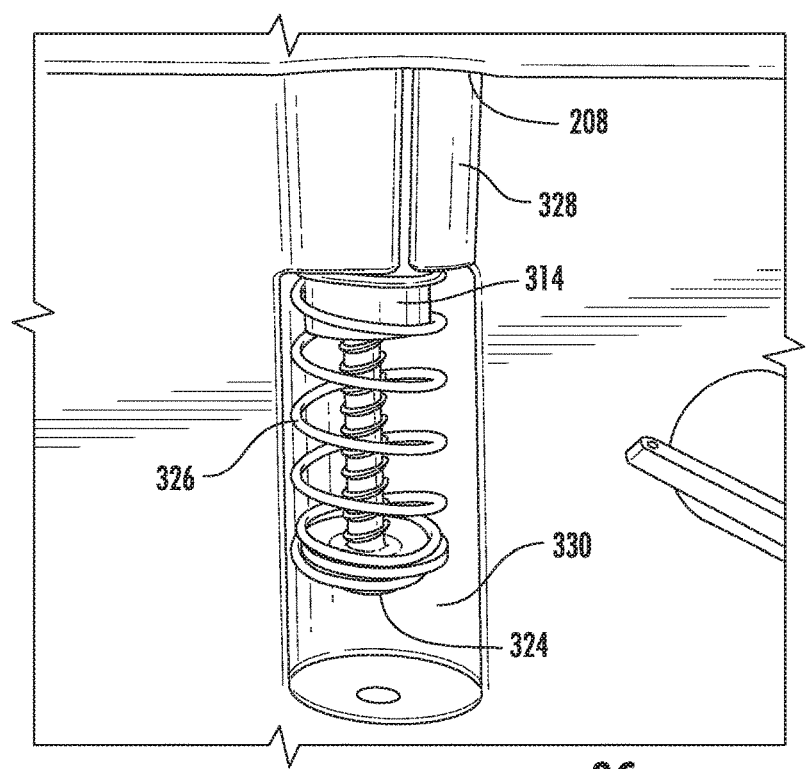

FIGS. 3A-3C present perspective and side elevation views of a rotating cup holder section 112 of the adjustable cup holder 109, in accordance with one example embodiment of the disclosure. Referring now to FIGS. 1-3C, the example rotating cup holder section 112 can include a bottom surface 302 configured to receive a portion of a cup when in the use configuration. In one example, the bottom surface 302 can be flat or substantially flat and generally or substantially in the shape of a semicircle and has an outer perimeter edge 332 that is curvilinear and/or radiused. The outer perimeter edge 332 may have a constant or variable radius. In one example, the radius of the outer perimeter edge 332 is the same or substantially the same as the radius of the outer perimeter edge 220 of the static cup holder section 110. Alternatively, the radius of the outer perimeter edge 332 can be different from the outer perimeter edge 220. The top surface of the bottom surface 302 can also include a friction increasing material.

The bottom surface 302 can also include a side edge 334 that extends from a first end of the outer perimeter edge 332 to a second distal end of the outer perimeter edge 332. In one example embodiment, the side edge 334 can be generally in the shape of a sinusoidal wave between a first end of the outer perimeter edge 332 to a second distal end of the outer perimeter edge 332. Alternatively, the side edge 334 can be straight, substantially straight, or have another curvilinear shape between the first end of the outer perimeter edge 332 and the second distal end of the outer perimeter edge 332. In one example, the shape of the side edge 334 corresponds in a mating manner to the shape of the side edge 222 such that the side edge 334 mates with the side edge 222 when the cup holder 109 is in the use configuration.

The rotating cup holder section 112 can further include a side wall 304 coupled to or integrally formed with the bottom surface 302 and extending generally vertically up from the bottom surface 302 to define an interior side surface. In certain example embodiments, the side wall 304 can extend vertically up from the bottom surface 302 at an angle between 90-120 degrees, and more preferably between 90-110 degrees, and even more preferably between 90-100 degrees to the bottom surface 302. In one example embodiment, the side wall 304 is curved and has a curvature that substantially matches the curvilinear shape and can have the same or greater radius as that of the outer perimeter edge 332 of the bottom surface 302 and substantially matches the curvature of the static side wall 204. In certain example embodiments, the side wall 304 has a perimeter that extends between 160-220 degrees along its outer perimeter and more preferably between 180-210 degrees and even more preferably between 180-200 degrees. The side wall 304 can further have a smooth interior side surface having a generally concave shape.

The rotating cup holder section 112 can also include a lip 306 disposed along a top edge of the side wall 304. The lip 306 can be a flat or radiused edge of the side wall 304. The rotating cup holder section 112 can also include a first alignment tab 308 and a second alignment tab 310. Each of the first alignment tab 308 and second alignment tab 310 can protrude radially outward from the outer perimeter of the lip 306 and/or an outer surface of the side wall 304. In one example, each of the first alignment tab 308 and second alignment tab 310 are sized and shaped to be inserted into or otherwise received by a corresponding recessed slot 210, 212 on the static cup holder section 110 in both the use and stored configurations. In certain example embodiments, the shape of each of the first alignment tab 308 and the second alignment tab 310 can be the same or substantially similar to and slightly smaller than the shape of the corresponding recessed slot 210, 212 or keyhole that it is intended to be received in. For example, the shapes can include, but are not limited to, round, oval, elliptical, square, rectangular, or any other geometric shape. The first alignment tab 308 can be disposed anywhere between 90-210 degrees from the second alignment tab 310 along an outer perimeter of the side wall 304 and more preferably between 120-180 degrees, and even more preferably between 150-180 degrees, and even more preferably 180 degrees. Further, while the example embodiment shows two recessed slots and two alignment tabs, this is for example purposes only, and one or more than two of each of the recessed slots and alignment tabs could be provided in other example embodiments.

The rotating cup holder section 112 can also include a handle 312 or gripping section. The handle 312 or gripping section may be disposed along the lip 306 of the side wall 304. In one example, the handle 312 or gripping section can extend axially upward and/or radially outward from the outer perimeter of the lip 306 and provides a means for gripping and repositioning the rotating cup holder section 112. In one example, the handle 312 can extend for at least 10 degrees along the outer circumference of the lip 306 of the side wall 304 and more preferably at least 20 degrees, and even more preferably at least 30 degrees. In one example, the handle 312 can include a convex top surface that extends above the top edge of the lip 306 of the side wall 304.

The rotating cup holder section 112 can also include an alignment shaft 314 disposed along a bottom side of the bottom surface 302. In one example, the alignment shaft is a cylindrical or substantially cylindrical shaft that extends axially downward from the bottom side of the bottom surface 302. As shown in FIG. 3B, the alignment shaft 314 can also include aligning means to assist with properly aligning the alignment shaft 314 in the aperture 208 to place the cup holder 109 in one of the use or stored configurations. In one example, the aligning means can be bosses 316, 318. A boss 316, 318 can be one or more planar or other shaped members that extend radially out from the alignment shaft 314 and extend axially along at least a portion of the alignment shaft 314. Further, the bosses 316, 318 can have different shapes or sizes or extend radially outward from the alignment shaft 314 at different distances so that only certain bosses 316, 318 will fit into corresponding boss receivers 214, 216 on the aperture 208. For example, the alignment shaft 314 can include one or more minor bosses 318 and one or more major bosses 316, 320. In this example, the major bosses 316, 320 are the same general shape but longer (extend out radially farther from the center of the alignment shaft 314) than the minor bosses 318 and are configured to fit into a larger boss receiver than the minor bosses 318. Alternatively, the major bosses 316, 320 could be wider (have a greater circumferential distance) than the minor bosses 318 or could have a different shape than the minor bosses 318.

In the example of FIG. 3B, two minor bosses 318 (only one shown) can be provided along the outer perimeter of the alignment shaft 314 and disposed at or substantially 180 degrees apart from one another along the perimeter of the alignment shaft 314. In addition, two major bosses 316, 320 can be provided along the outer perimeter of the alignment shaft 314 and disposed at or substantially 180 degrees apart from one another along the perimeter of the alignment shaft 314 such that each major boss 316, 320 is at or substantially 90 degrees from each minor boss 318. While the example embodiment of FIG. 3B shows two major bosses 316, 320 and two minor bosses 316, those of ordinary skill in the art will recognize that fewer or greater numbers of each are possible. Further, while the example embodiment of FIG. 3B shows the two major bosses 318, 320 disposed at or substantially 180 degrees from one another and the two minor bosses 318 disposed at or substantially 180 degrees from one another, this is for example purposes only as other layouts are contemplated within the scope of this disclosure. For example, the major bosses 316, 320 could be disposed anywhere between 5-180 degrees apart from one another along the perimeter of the alignment shaft 314 and the minor bosses 318 can also be positioned anywhere between 5-180 degrees apart from one another along the perimeter of the alignment shaft 314 in other example embodiments.

The alignment shaft 314 can also include an aperture 322 disposed along a bottom surface of the alignment shaft 314. The aperture 322 can extend axially through the alignment shaft 314 generally in a vertical direction and can provide a channel through at least a portion of the alignment shaft 314. A spring retainer 324 can be removably, rotatably, and/or threadably coupled to the alignment shaft 314 and disposed at least partially into the aperture 322. In one example embodiment, the spring retainer 324 is a screw, bolt, rivet, pin, or other retaining device. Alternatively, the spring retainer 324 can be another form of a threaded or non-threaded rod that includes an end portion that has a radius that is equal to or greater than the inner radius of a biasing means, such as a spring, 326, and an elongated portion that extends from the end portion that has a radius that is equal to or less than the inner radius of the biasing means 326.

A biasing means, such as a spring 326, can be disposed between an end portion of the spring retainer 324 (e.g., the head of a screw, bolt, rivet, pin, etc.) and the alignment shaft 314. A portion of the alignment shaft 314 can be positioned through the aperture 208 and the alignment shaft passage 328 and extend into a recessed area 330 of the side panel 108. The biasing means 326, such as a spring, can have one end that abuts a bottom side of the wall surrounding the aperture 208 or bottom side of the wall surrounding the alignment shaft passage 328 (an extension of the aperture 208) and an opposing end that abuts the end of the spring retainer 324 with the spring retainer 324 having an elongated portion that extends axially through the channel defined by the inner diameter of the biasing means 326 and having at least a portion of its opposing end coupled to the alignment shaft 314.

The biasing means 326 biases the rotating cup holder section 112 vertically down such that the biasing means 326 provides a vertical force to maintain the bottom side of the bottom surface 302 of the rotating cup holder section 112 in contact with one or more of the top surface of the primary bottom surface 202 and/or recessed bottom surface 206. In one example embodiment, the biasing means 326 is a compression spring. In an alternative embodiment, the biasing means can be an extension spring, leaf spring, a resilient member, or other form of spring. The biasing means 326 is configured to provide a biasing force to hold the rotating cup holder section 112 down either in the use or stored configuration but allow a user to provide a lifting force in the vertical direction to adjust the positioning of the rotating cup holder section 112 when desired.

Figure 4B:
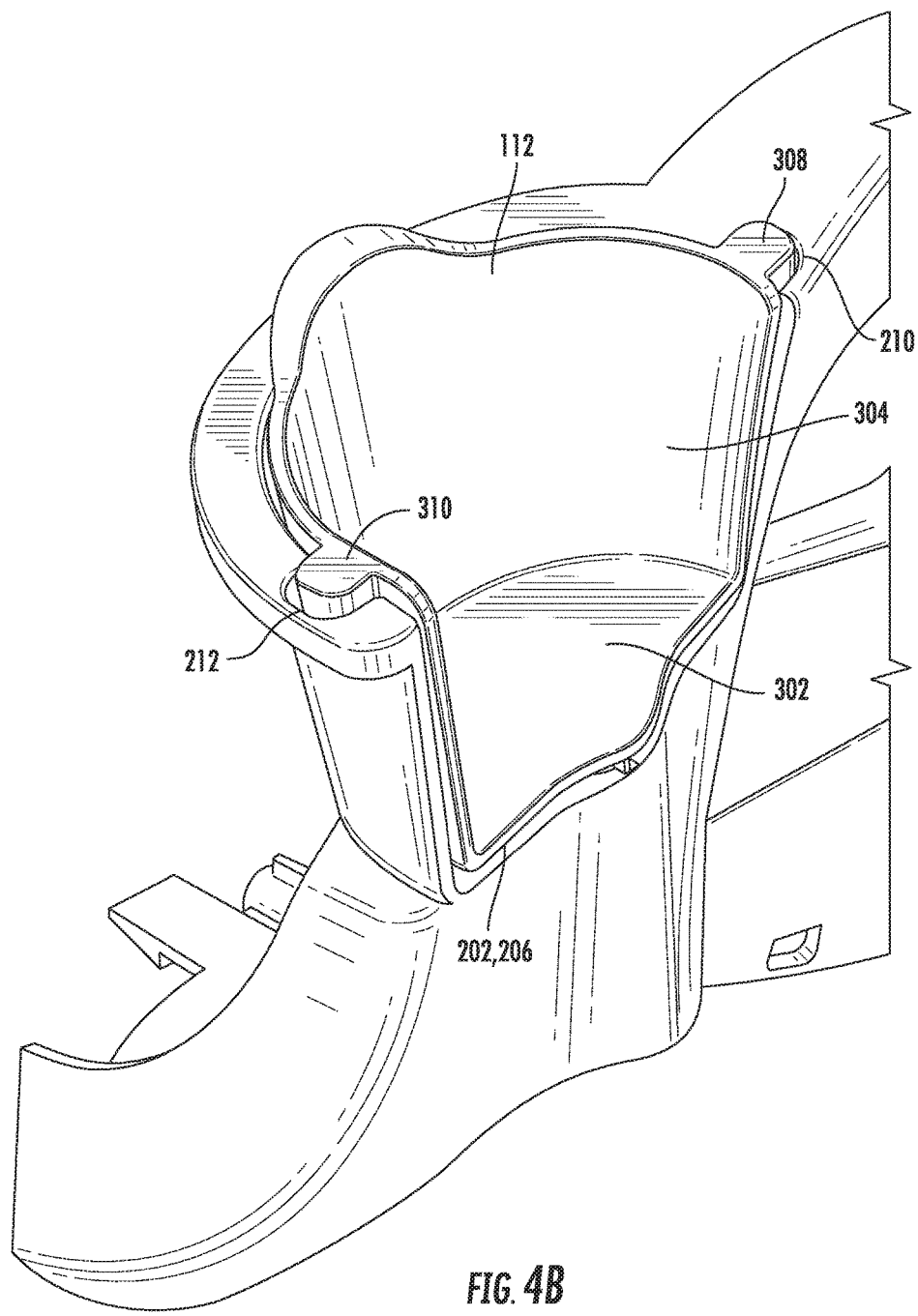
Figure 4C:
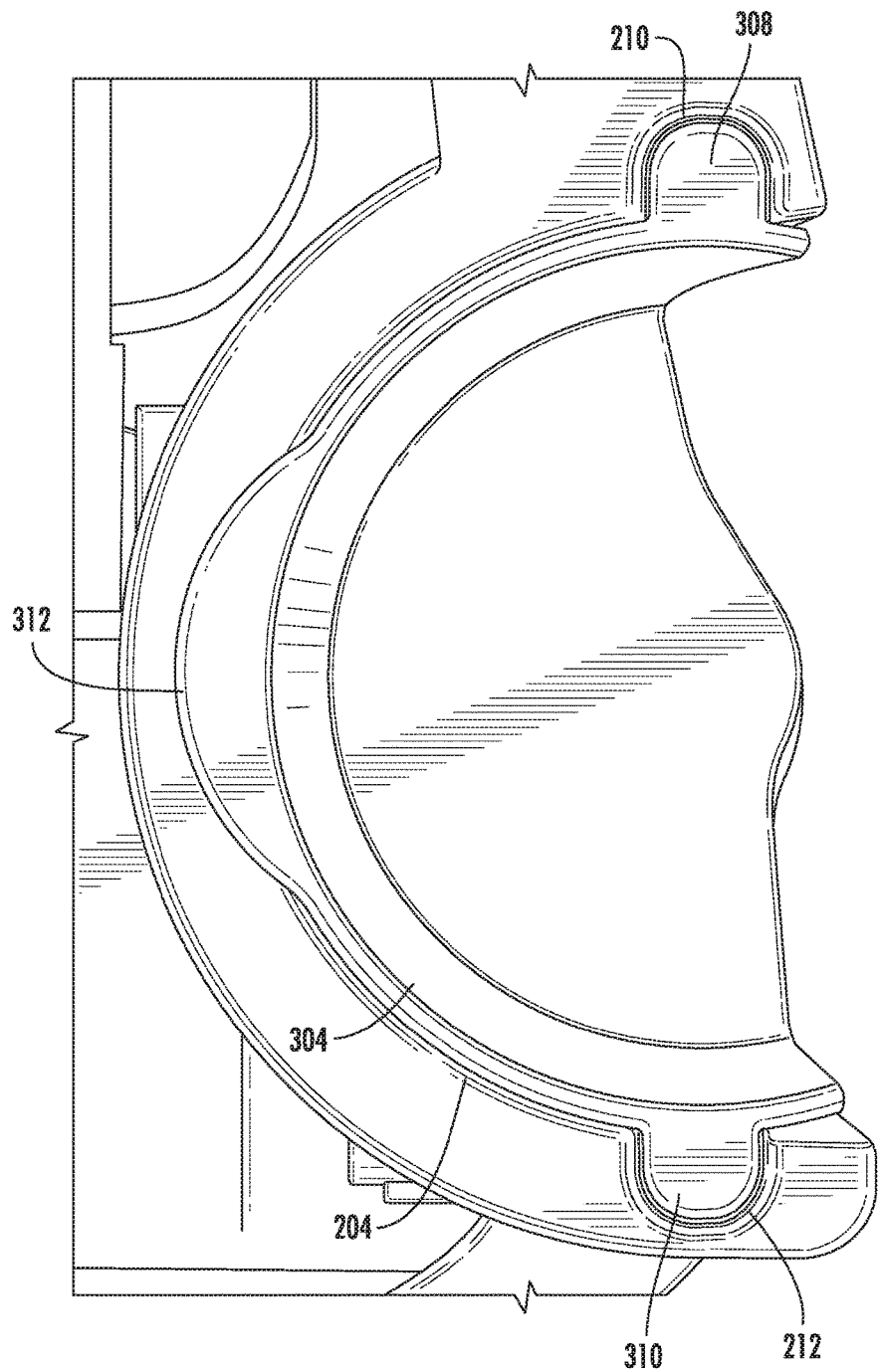

FIGS. 4A-4C present perspective and top plan views of the adjustable cup holder 109 in a stored configuration, in accordance with one example embodiment of the disclosure. Referring now to FIGS. 1-4C, the rotating cup holder section 112 is nested, or positioned in the stored configuration, into the static cup holder section 110 in FIGS. 4A-4C. In this stored configuration, the bottom side of the bottom surface 302 of the rotating cup holder section 112 abuts and rests upon the top surface of the primary bottom surface 202 of the static cup holder section 110. In one example embodiment, the bottom side of the bottom surface 302 does not make contact with the top surface of the recessed bottom surface 206 in the stored configuration. The side wall 304 of the rotating cup holder section 112 abuts and/or is disposed adjacent the side wall 204 of the static cup holder section 110 in the stored configuration. The first alignment tab 308 is disposed either fully or at least partially within the first recessed slot 210 and the second alignment tab 310 is disposed either fully or at least partially within the second recessed slot 212 in the stored configuration. The handle 312 extends above the top surface of the static cup holder section 110 and at least a portion of the handle 312 can extend radially outward from the lip 306 to extend outwardly over at least a portion of the top surface of the static cup holder section 110.

Figure 5B:
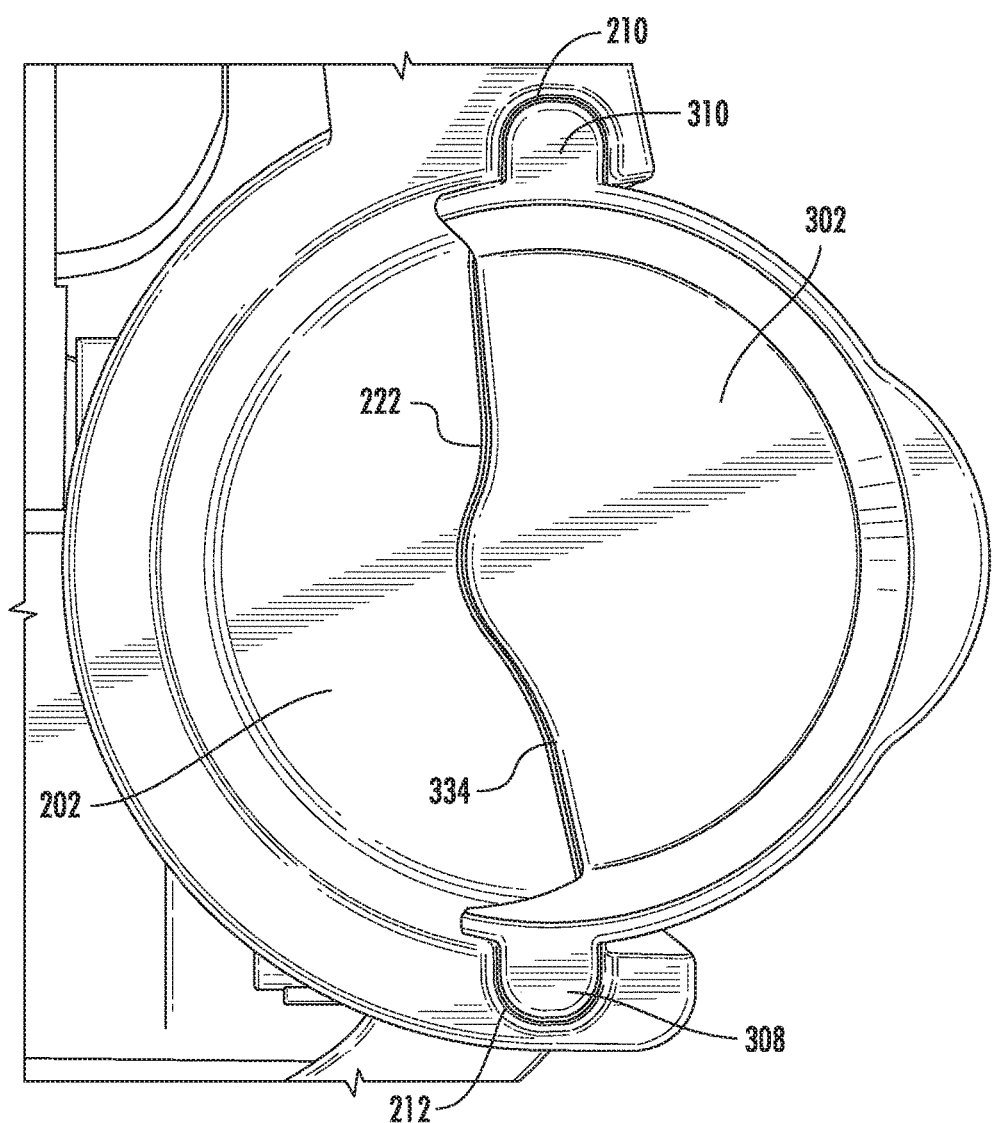

FIGS. 5A-5B present perspective and top plan views of the adjustable cup holder 109 in a use configuration, in accordance with one example embodiment of the disclosure. Referring now to FIGS. 1-5B, the bottom side of the bottom surface 302 of the rotating cup holder section 112 abuts and rests upon the top surface of the recessed bottom surface 206 of the static cup holder section 110 in the use configuration, as shown in FIGS. 5A-5B. In certain example embodiments, in the use configuration, a portion (e.g., less than 30%, 20%, 10%, or 5%) of the side wall 304 of the rotating cup holder section 112 overlaps and is disposed adjacent the side wall 204 of the static cup holder section 110. Alternatively, there can be no overlap between the side wall 304 and the side wall 204 in the use configuration. The first alignment tab 308 is disposed either fully or at least partially within the second recessed slot 212 and the second alignment tab 310 is disposed either fully or at least partially within the first recessed slot 210 in the use configuration. Further, the side edge 222 of the primary bottom surface 202 of the static cup holder section 110 can nest with and abut or be disposed adjacent to the side edge 334 of the bottom surface 302 of the rotating cup holder section 112.

Figure 6A:
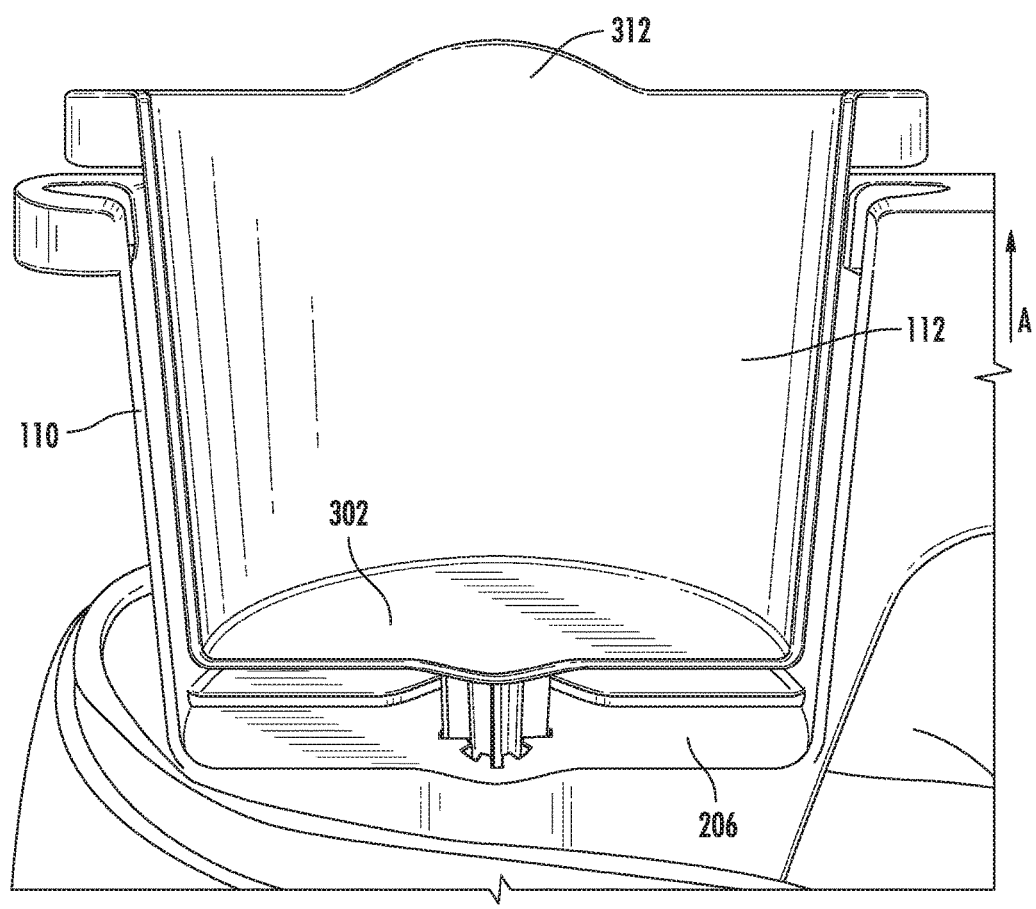
FIGS. 6A-6D present partial perspective views showing the adjustment of the adjustable cup holder from a storage configuration to a use configuration through manipulation of the rotating cup holder section, in accordance with one example embodiment of the disclosure.

FIGS. 6A-6D present multiple perspective views showing the adjustment of the adjustable cup holder 109 from a storage configuration to a use configuration through manipulation of the rotating cup holder section 112, in accordance with one example embodiment of the disclosure. Referring now to FIGS. 1-6D, a user can grip the rotating cup holder section 112, for example by the handle 312 if one is provided and otherwise by the side wall 304 or bottom surface 302 and provide a lifting force upward in the direction "A", as shown in FIG. 6A. In one example, the upward lifting force must be greater than the biasing force of the biasing means 326, such as the spring, resilient member, or other biasing means. This lifting force in the "A" direction will pull the alignment shaft 314 upwards in the direction "A" a sufficient distance to remove each of the alignment bosses 316-320 out of the alignment boss receivers 214-216 and to remove the first alignment tab 308 out from the first recessed slot 210 and the second alignment tab 310 out from the second recessed slot 212.

Figure 6B:
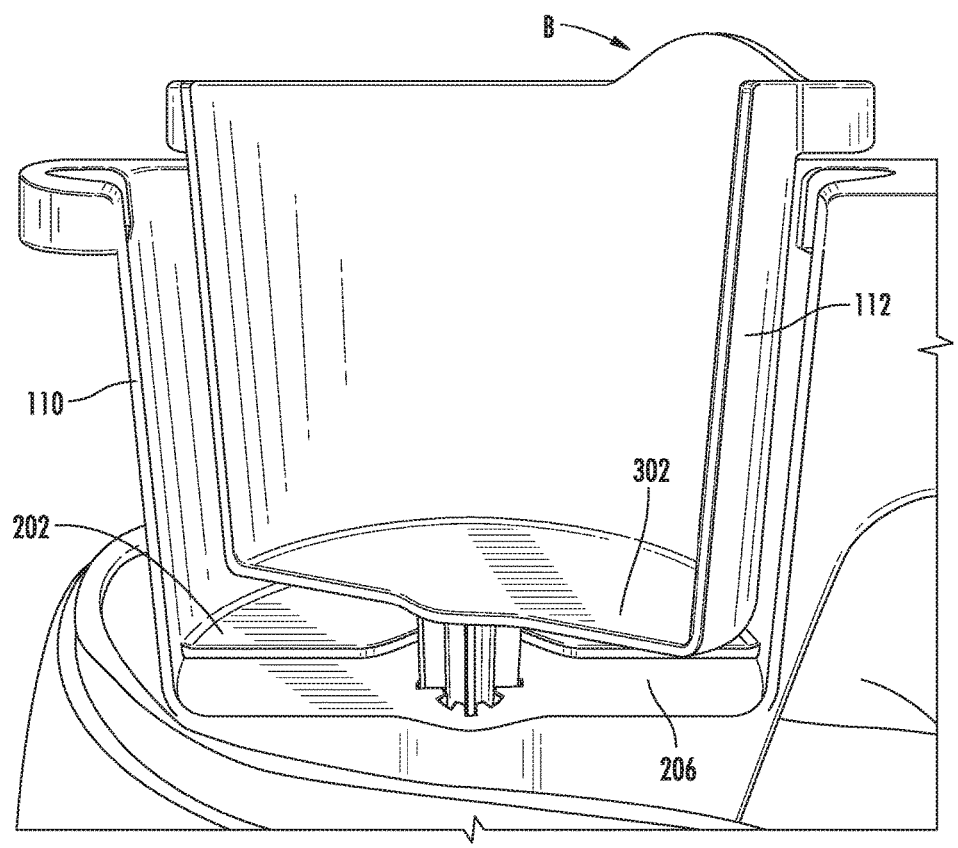
Figure 6C:
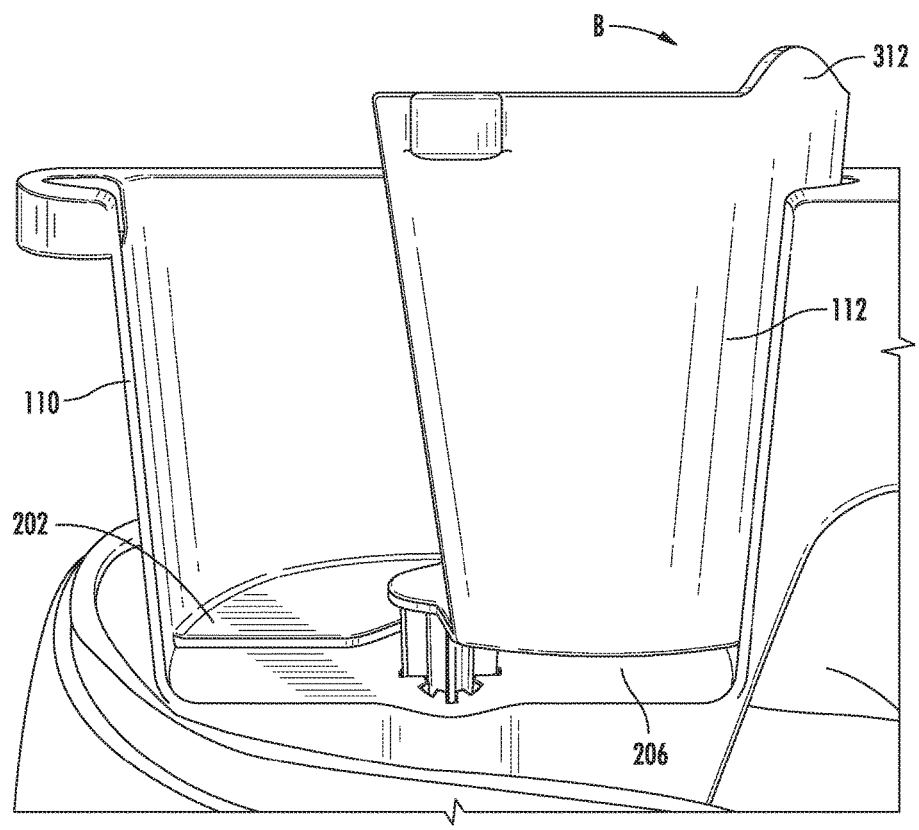
Figure 6D:
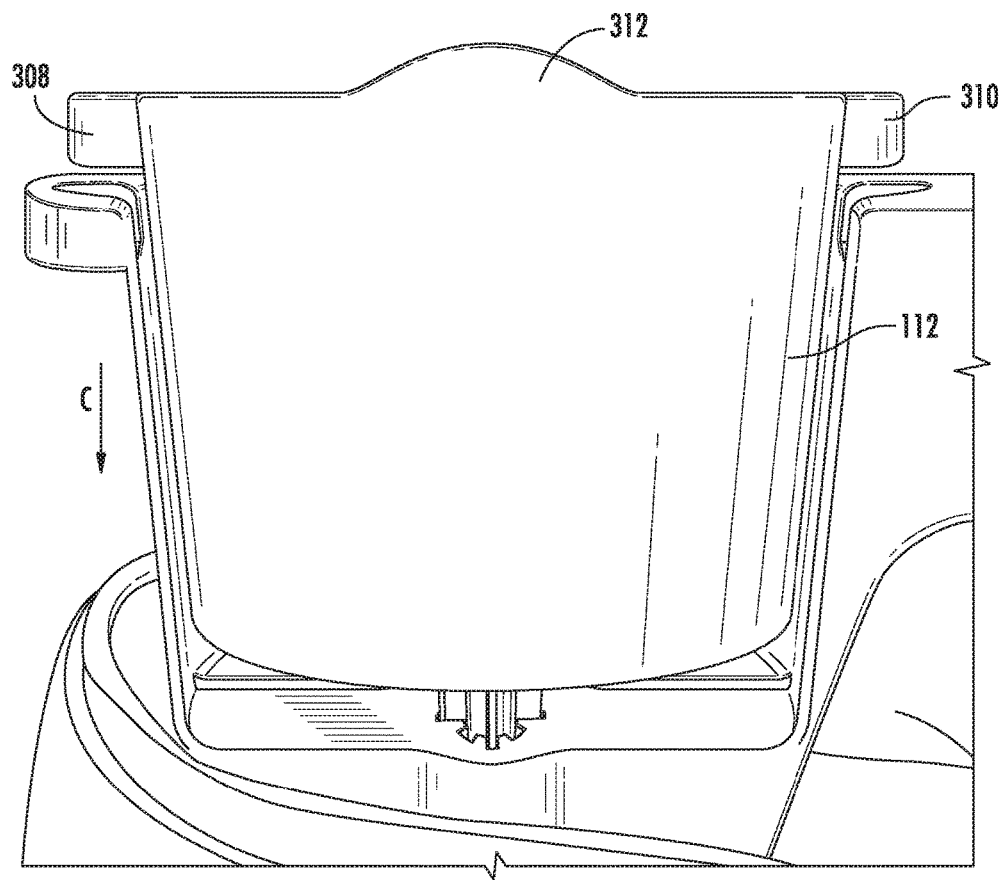

As shown in FIGS. 6B-6D, the rotating cup holder section 112 is rotated (e.g., in the direction "B" but could alternatively be rotated in the direction opposite "B") about a vertical or substantially vertical axis defined by the alignment shaft 314. While the example embodiment shows the rotating cup holder section 112 rotating in a clockwise direction, it could alternatively be rotated in a counter-clockwise direction. The rotating cup holder section 112 is rotated with respect to the static cup holder section 110 until each of the alignment bosses 316-320 once again align with their proper alignment boss receivers 214-216 and/or until the first alignment tab 308 is disposed above the second recessed slot 212, and the second alignment tab 310 is disposed above the first recessed slot 210. The user can then reduce the upward lifting force in the "A" direction on the rotating cup holder section 112 and the biasing force of the biasing means 326 will pull the rotating cup holder section 112 downward in the direction "C" until the alignment bosses 316-320 enter their corresponding alignment boss receivers 214-216, the first alignment tab 308 enters into the second recessed slot 212, the second alignment tab 310 enters into the first recessed slot 210, and/or the bottom side of the bottom surface 302 abuts the top surface of the recessed bottom surface 206. While the example embodiment shown describes the alignment bosses and alignment boss receivers being configured to only allow the rotating cup holder section 112 to either be in the use configuration or the stored configuration, in other example embodiments, the layout of the alignment bosses and alignment boss receivers as well as one or more of the alignment tabs and recessed slots can be such that the rotating cup holder section can be positioned in intermediate positions between the use configuration and the stored configuration (e.g., rotated anywhere between 20-180 degrees from the stored configuration).

As shown above, particularly with reference to FIGS. 3A-C, at least a portion of the rotating cup holder section 112 remains in contact with or held by the static cup holder section 110 during the entire repositioning from a stored configuration to a use configuration. As such, the rotating cup holder section 112 is not completely separated from the cup holder 109 and potentially lost. Further, the bosses, boss receivers, tabs and slots ensure the proper positioning of the rotating cup holder section 112 with respect to the static cup holder section 110 in either the use or stored configuration. Those of ordinary skill in the art will recognize that moving the rotating cup holder section 112 from the use configuration to the stored configuration will essentially be an inverse of the steps outlined above for moving the rotating cup holder section 112 from the stored configuration to the use configuration.

While the above description contains many specifics, these specifics should not be construed as limitations on the scope of the disclosure, but merely as exemplifications of the disclosed embodiments. Those skilled in the art will envision many other possible variations that are within the scope of the disclosure.

What is claimed is:

1. A child seat comprising:
   a seat bottom portion;
   an adjustable cup holder disposed adjacent the seat bottom portion, the adjustable cup holder comprising:
      a static cup holder section; and
      a rotatable cup holder section rotatably coupled to the static cup holder section and rotatable with respect to the static cup holder section, the rotatable cup holder section comprising:
         a bottom surface configured to receive at least another portion of the cup thereon in the use configuration;
         a side wall having a bottom end and a distal top end, wherein the bottom end of the side wall is coupled to the bottom surface; and
         at least one alignment tab extending radially outward from the side wall;
      wherein the rotatable cup holder section is configured to be rotated from a stored configuration to a use configuration.

2. The child seat of claim 1, wherein the static cup holder section comprises:
   a static bottom surface configured to receive at least a portion of a cup thereon in the use configuration;
   a static side wall having a bottom end and a distal top end, wherein the bottom end of the static side wall is coupled to the static bottom surface; and
   at least one recessed slot disposed along the static side wall.

3. The child seat of claim 2, wherein a first recessed slot and a second recessed slot are disposed along the static side wall, wherein the first recessed slot is disposed in a range of substantially 90 degrees to substantially 210 degrees from the second recessed slot along the static side wall.

4. The child seat of claim 2, wherein the static bottom surface further comprises a first static bottom surface having a first top side and a recessed static bottom surface having a second top side, wherein the second top side is disposed below the first top side of the first static bottom surface.

5. The child seat of claim 2, wherein the static bottom surface further comprises:
   an aperture disposed through the static bottom surface;
   at least one first boss receiver extending from a perimeter of the aperture; and
   at least one second boss receiver extending from the perimeter of the aperture.

6. The child seat of claim 5, wherein the at least one first boss receiver differs from the at least one second boss receiver in at least one of shape and size.

7. The child seat of claim 1, wherein the rotatable cup holder section further comprises:
   an alignment shaft coupled to a bottom side of the bottom surface and extending axially from the bottom side of the bottom surface, the alignment shaft comprising:
      at least one first alignment boss coupled to an outer perimeter of the alignment shaft and extending axially along a portion of the alignment shaft and radially outward from the outer perimeter of the alignment shaft; and
      at least one second alignment boss coupled to the outer perimeter of the alignment shaft and extending axially along another portion of the alignment shaft and radially outward from the outer perimeter of the alignment shaft.

8. The child seat of claim 7, wherein the first alignment boss differs from the second alignment boss in at least one of a shape and a size.

9. The child seat of claim 1, wherein the rotatable cup holder section further comprises:
   a spring retainer comprising a first end coupled to the alignment shaft and a distal second end, wherein the distal second end has an outer diameter greater than an inner diameter of a spring; and
   the spring disposed against the spring retainer.

10. The child car seat of claim 1, further comprising a seat back portion coupled to the seat bottom portion.

11. The child car seat of claim 1, wherein the static cup holder section is integrally formed with at least a portion of the seat bottom portion.

12. The child seat of claim 1, wherein the child seat is one of a child car seat, a stroller, a swing, a high chair, a rocker, or a booster seat.

13. An adjustable cup holder configured to be adjusted from a stored configuration to a use configuration, the adjustable cup holder comprising:
   a static cup holder section comprising:
      a static bottom surface configured to receive at least a portion of a cup thereon in the use configuration;
      a static side wall having a bottom end and a distal top end, wherein the bottom end of the static side wall is coupled to the static bottom surface; and
      at least two recessed slots disposed along the top end of the static side wall;
   a rotatable cup holder section rotatably coupled to and rotatable with respect to the static cup holder section and configured to be rotated from the stored configuration to the use configuration, the rotatable cup holder section comprising:
      a bottom surface configured to receive at least another portion of the cup thereon in the use configuration;
      a side wall having a bottom end and a distal top end, wherein the bottom end of the side wall is coupled to the bottom surface; and at least two alignment tabs extending radially from the side wall, wherein each of the at least two alignment tabs is configured to be received in a corresponding one of the at least two recessed slots.

14. The adjustable cup holder of claim 13, wherein the static bottom surface comprises a first static bottom surface having a first top side and a recessed static bottom surface having a second top side, wherein the second top side is disposed below the first top side of the first static bottom surface.

15. The adjustable cup holder of claim 13, wherein the static cup holder section further comprises:
an aperture disposed through the static bottom surface;
a plurality of first boss receivers extending radially outward from an outer perimeter of the aperture; and
a plurality of second boss receivers extending radially outward from the outer perimeter of the aperture;
wherein the plurality of first boss receivers differs from the plurality of second boss receivers in at least one of shape and size.

16. The adjustable cup holder of claim 15, wherein the rotatable cup holder section further comprises:
an alignment shaft coupled to a bottom side of the bottom surface and extending axially from the bottom side of the bottom surface through the aperture, the alignment shaft comprising:
a plurality of first alignment bosses coupled to an outer perimeter of the alignment shaft and extending axially along a portion of the alignment shaft and radially outward from the outer perimeter of the alignment shaft, each first alignment boss configured to be received in a corresponding one of the plurality of first boss receivers;
a plurality of second alignment bosses coupled to the outer perimeter of the alignment shaft and extending axially along another portion of the alignment shaft and radially outward from the outer perimeter of the alignment shaft, each second alignment boss configured to be received in a corresponding one of the plurality of second boss receivers,
wherein the plurality of first alignment bosses differs from the plurality of second alignment bosses in at least one of a shape and a size.

17. The adjustable cup holder of claim 16, wherein the rotatable cup holder section further comprises:
a spring retainer comprising a first end coupled to the alignment shaft and a distal second end, wherein the distal second end has an outer diameter greater than an inner diameter of a spring; and
the spring comprising a first end disposed against the second end of the spring retainer and a second end disposed against the static bottom surface of the static cup holder section.

18. A method for positioning an adjustable cup holder from a stored configuration to a use configuration comprising:
providing a child seat comprising:
a seat bottom; and
an adjustable cup holder disposed adjacent the seat bottom, the adjustable cup holder comprising:
a static cup holder section comprising:
a static bottom surface;
a static side wall having a bottom end and a distal top end, wherein the bottom end of the static side wall is coupled to the static bottom surface; and
at least two recessed slots disposed along the top end of the static side wall;
an aperture disposed through the recessed static bottom surface;
a rotatable cup holder section rotatably coupled to the static cup holder section and comprising:
a bottom surface;
a side wall having a bottom end and a distal top end, wherein the bottom end of the side wall is coupled to the bottom surface;
at least two alignment tabs extending radially from the side wall, wherein each of the at least two alignment tabs is configured to be received in a corresponding one of the at least two recessed slots; and
an alignment shaft coupled to a bottom side of the bottom surface and extending axially from the bottom side of the bottom surface through the aperture;
raising the rotatable cup holder section vertically with respect to the static cup holder section to remove a first alignment tab from a first recessed slot and a second alignment tab from a second recessed slot;
rotating the rotatable cup holder section with respect to the static cup holder section about a vertical axis defined by the alignment shaft; and
lowering the rotatable cup holder section vertically with respect to the static cup holder section to position the first alignment tab in the second recessed slot and the second alignment tab in the first recessed slot.

19. The method of claim 18, further comprising positioning the adjustable cup holder from the use configuration to the stored configuration, comprising:
raising the rotatable cup holder section vertically with respect to the static cup holder section to remove the first alignment tab from the second recessed slot and the second alignment tab from the first recessed slot;
rotating the rotatable cup holder section with respect to the static cup holder section about the vertical axis; and
lowering the rotatable cup holder section vertically with respect to the static cup holder section to position the first alignment tab in the first recessed slot and the second alignment tab in the second recessed slot.

20. A child seat comprising:
a seat bottom portion;
an adjustable cup holder disposed adjacent the seat bottom portion, the adjustable cup holder comprising:
a static cup holder section comprising:
a static bottom surface configured to receive at least a portion of a cup thereon in the use configuration, the first static bottom surface comprising:
a first static bottom surface having a first top side; and
a recessed static bottom surface having a second top side,
wherein the second top side is disposed below the first top side of the first static bottom surface;
a static side wall having a bottom end and a distal top end, wherein the bottom end of the static side wall is coupled to the static bottom surface;
at least one recessed slot disposed along the static side wall; and
a rotatable cup holder section rotatably coupled to the static cup holder section and rotatable with respect to the static cup holder section, the rotatable cup holder section configured to be rotated from a stored configuration to a use configuration.

* * * * *